United States Patent
Luo et al.

(10) Patent No.: US 11,296,833 B2
(45) Date of Patent: Apr. 5, 2022

(54) ACK/NACK RESOURCE ALLOCATION METHOD, AND CORRESPONDING USER EQUIPMENT AND BASE STATION

(71) Applicants: Sharp Kabushiki Kaisha, Osaka (JP); FG Innovation Company Limited, New Territories (HK)

(72) Inventors: Chao Luo, Shanghai (CN); Renmao Liu, Shanghai (CN)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 82 days.

(21) Appl. No.: 16/763,570

(22) PCT Filed: Nov. 15, 2018

(86) PCT No.: PCT/CN2018/115682
§ 371 (c)(1),
(2) Date: May 13, 2020

(87) PCT Pub. No.: WO2019/096216
PCT Pub. Date: May 23, 2019

(65) Prior Publication Data
US 2020/0389265 A1 Dec. 10, 2020

(30) Foreign Application Priority Data
Nov. 17, 2017 (CN) .......................... 201711155499.3

(51) Int. Cl.
*H04J 3/00* (2006.01)
*H04L 1/18* (2006.01)
(Continued)

(52) U.S. Cl.
CPC .......... *H04L 1/1893* (2013.01); *H04L 1/1861* (2013.01); *H04L 5/14* (2013.01); *H04W 72/042* (2013.01); *H04W 72/0446* (2013.01)

(58) Field of Classification Search
CPC ....... H04L 1/1893; H04L 1/1861; H04L 5/14; H04L 1/1854; H04L 5/0094;
(Continued)

(56) References Cited

U.S. PATENT DOCUMENTS

2017/0230961 A1 8/2017 Park et al.
2018/0367278 A1* 12/2018 Chatterjee ............. H04L 1/1854
(Continued)

FOREIGN PATENT DOCUMENTS

WO 2017/116120 A1 7/2017

OTHER PUBLICATIONS

Huawei et al., "New WID on Further NB-IoT enhancements", 3GPP TSG RAN Meeting #75, RP-170852, Mar. 6-9, 2017, 6 pages.
(Continued)

*Primary Examiner* — Mang Hang Yeung
(74) *Attorney, Agent, or Firm* — ScienBiziP, P.C.

(57) ABSTRACT

The present disclosure provides an acknowledgment message resource allocation method applicable to an NB-IoT TDD cell, and a corresponding base station and corresponding user equipment for performing the method. The user equipment according to an embodiment of the present invention includes: a receiving unit, configured to receive allocation information of acknowledgment message transmission resources, the allocation information including offset indication information instructing an offset $j_0$ of a start time of the acknowledgment message transmission resources with respect to a reference time, and the offset $j_0$ instructing an offset expressed by a number of NB-IoT uplink slots; and a transmitting unit, configured to perform
(Continued)

acknowledgment message transmission based on the allocation information.

4 Claims, 8 Drawing Sheets

(51) Int. Cl.
*H04L 5/14* (2006.01)
*H04W 72/04* (2009.01)

(58) Field of Classification Search
CPC .............. H04L 5/0055; H04W 72/042; H04W 72/0446; H04W 72/0413
USPC .......................................................... 370/280
See application file for complete search history.

(56) References Cited

U.S. PATENT DOCUMENTS

| | | | |
|---|---|---|---|
| 2020/0236524 A1* | 7/2020 | Ye | H04L 5/0094 |
| 2020/0267033 A1* | 8/2020 | Yan | H04L 27/10 |
| 2020/0288457 A1* | 9/2020 | Hong | H04W 72/0413 |

OTHER PUBLICATIONS

Lenovo et al., "Views on common issue for TDD NBIoT", R1-1717441, 3GPP TSG RAN WG1 Meeting #90bis, Prague, P.R. Czech Oct. 9-13, 2017.

* cited by examiner

FIG. 1

TABLE 4.2-2: UPLINK-DOWNLINK CONFIGURATION

| UPLINK-DOWNLINK CONFIGURATION | DOWNLINK TO UPLINK TRANSITION POINT PERIOD | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 2

MAPPING FROM SUBFRAME N+K0-1 TO ACK/NACK START SUBFRAME (TDD UPLINK-DOWNLINK CONFIGURATION 3, 15 KHZ SUBCARRIER SPACING)

ACK/NACK RESOURCE ALLOCATION METHOD, AND CORRESPONDING USER EQUIPMENT AND BASE STATION

TECHNICAL FIELD

The present disclosure relates to the field of wireless communications technologies. More specifically, the present disclosure relates to a method for allocating acknowledgment message transmission resources, corresponding user equipment, and a corresponding base station.

BACKGROUND

NarrowBand Internet of Things (NB-IoT) is wireless communication technical specification introduced by the 3rd Generation Partnership Project (3GPP) to the Rel-13 version to meet the growing demand for machine-type communications. As compared with a conventional cellular communications system, the main characteristics of NB-IoT are improved indoor coverage, support for a large number of low-rate connections, ultra-low device cost, ultra-low device power consumption, low device delay sensitivity, and so on. Uplink and downlink bandwidths of an NB-IoT system both require 180 kHz only, which is the same as the bandwidth of one physical resource block (PRB) in an LTE system. NB-IoT supports three different operation modes: (1) stand-alone mode, for example, using one carrier in a GSM system; (2) guard-band operation mode, for example, using 180 kHz spectrum in a guard-band in an LTE carrier; and (3) in-band operation mode, for example, using one PRB in an LTE carrier.

The NB-IoT in the Rel-13 version supports only frequency-division duplex (FDD) and does not support time-division duplex (TDD). A new work item on further NB-IoT enhancements (see RP-170852: New WID on Further NB-IoT enhancements) was proposed at the 3GPP RAN #75 plenary meeting in March 2017. One of the goals of this research project on the Rel-15 version is to add support for TDD. The baseline goal is to use the same set of mechanisms to support the in-band, guard-band, and standalone operation modes in TDD.

In FDD, each uplink subframe directly corresponds to one downlink subframe with the same number. However, in TDD, uplink and downlink subframes are numbered together. Such unique uplink-downlink subframe configuration determines that uplink subframes thereof appear only at specific subframe positions. Therefore, the uplink transmission resource allocation mechanism of FDD cannot be completely reused in TDD. For example, the existing mechanism of allocating ACK/NACK resources based on subframe offsets in FDD cannot fully apply to TDD, because a plurality of different subframe offsets may correspond to the same uplink ACK/NACK start subframe, failing to achieve the effect of time domain reuse.

Thus, an uplink transmission resource (such as ACK/NACK resource) allocation scheme applicable to TDD is needed.

SUMMARY

In order to solve at least some of the aforementioned problems, embodiments of the present invention provide an acknowledgment message (ACK/NACK) resource allocation scheme applicable to an NB-IoT TDD cell, and the scheme can flexibly allocate uplink time-frequency resources to user equipment for transmitting an ACK/NACK for an NPDSCH. The embodiments of the present invention further provide a base station and user equipment for executing the aforementioned scheme.

According to a first aspect of the embodiments of the present invention, user equipment is provided, comprising: a receiving unit, configured to receive allocation information of acknowledgment message transmission resources, the allocation information comprising offset indication information instructing an offset $j_0$ of a start time of the acknowledgment message transmission resources with respect to a reference time, and the offset $j_0$ instructing an offset expressed by a number of NB-IoT uplink slots; and a transmitting unit, configured to perform acknowledgment message transmission based on the allocation information.

According to a second aspect of the embodiments of the present invention, a method for allocating acknowledgment message transmission resources is provided. The method may comprise: receiving allocation information of acknowledgment message transmission resources, the allocation information comprising offset indication information instructing an offset $j_0$ of a start time of the acknowledgment message transmission resources with respect to a reference time, and the offset $j_0$ instructing an offset expressed by a number of NB-IoT uplink slots; and performing acknowledgment message transmission based on the allocation information.

According to a third aspect of the embodiments of the present invention, a base station is provided. The base station may comprise: a processing unit, configured to generate allocation information for instructing acknowledgment message transmission resources, the allocation information comprising offset indication information instructing an offset $j_0$ of a start time of the acknowledgment message transmission resources with respect to a reference time, and the offset $j_0$ instructing an offset expressed by a number of NB-IoT uplink slots; and a transmitting unit, configured to transmit the allocation information to user equipment.

According to a fourth aspect of the embodiments of the present invention, a method for allocating acknowledgment message transmission resources is provided. The method may comprise: generating allocation information for instructing acknowledgment message transmission resources, the allocation information comprising offset indication information instructing an offset $j_0$ of a start time of the acknowledgment message transmission resources with respect to a reference time, and the offset $j_0$ instructing an offset expressed by a number of NB-IoT uplink slots; and transmitting the allocation information to user equipment.

In some embodiments, the offset $j_0$ instructs starting acknowledgment message transmission from a $j_0^{th}$ NB-IoT uplink slot after the end of subframe n+12, where subframe n is an end subframe of downlink transmission to be acknowledged.

In some embodiments, the offset indication information is an index for joint allocation of the offset $j_0$ and subcarriers allocated for acknowledgment message transmission.

In some embodiments, in the case the acknowledgment message transmission uses 3.75 kHz subcarrier spacing, a value set of the offset $j_0$ may be one of the following sets: {0, 4}, {0, 3}, {0, 2}, and {0, 1}.

In some embodiments, in the case in which the acknowledgment message transmission uses 15 kHz subcarrier spacing, a value set of the offset $j_0$ may be one of the following sets: {0, 4, 8, 10}, {0, 4, 8, 12}, {0, 2, 8, 10}, {0, 2, 8, 12}, {0, 2, 4, 6}, {0, 2, 4, 8}, {0, 2, 4, 10}, {0, 2, 4, 12}, {0, 2, 6, 8}, {0, 2, 6, 10}, {0, 2, 6, 12}, {0, 6, 8, 10}, {0, 6, 8, 12}, {0, 4, 6, 8}, {0, 4, 6, 10}, {0, 4, 6, 12}, and {0, 8, 10, 12}.

BRIEF DESCRIPTION OF THE DRAWINGS

The above and other features of the present disclosure will become more apparent with the following detailed description in conjunction with the accompanying drawings.

In the accompanying drawings, similar reference numerals indicate similar elements.

DETAILED DESCRIPTION

The following describes the present application in detail with reference to the accompanying drawings and specific embodiments. It should be noted that the present application should not be limited to the specific embodiments described below. In addition, for simplicity, detailed description of the known art not directly related to the present application is omitted to prevent confusion in understanding the present application.

The base station in the present invention is an entity for communicating with user equipment, and may refer to a Node B or an evolved Node B (eNB) or an access point (AP).

The user equipment in the present invention may also refer to a terminal, an access terminal, a station, a mobile station or the like. The user equipment may be a cellular phone, a personal digital assistant (PDA), a cordless phone, a notebook computer, a mobile phone, a smart phone, a handheld device, a netbook or the like.

Embodiments of the present invention mainly involve an allocation scheme for uplink transmission resources in NB-IoT TDD, in particular an allocation scheme for resources for transmitting an acknowledgment message (ACK/NACK). The present invention will be specifically described below by using an allocation scheme for ACK/NACK resources as an example, but it should be understood that the embodiments of the present invention are not limited thereto, and may also be applicable to allocation of other uplink transmission resources.

As mentioned earlier, the existing mechanism of allocating ACK/NACK resources based on subframe offsets in FDD does not apply to TDD, because a plurality of different subframe offsets may correspond to the same uplink ACK/NACK start subframe, failing to achieve the effect of time domain reuse. The background of this problem is briefly introduced below.

NB-IoT defines the following channels in a downlink direction:

Narrowband physical downlink shared channel (NPDSCH), used to transmit user data.

Narrowband physical broadcast channel (NPBCH), used to transmit broadcast information.

Narrowband physical downlink control channel (NPDCCH), used to transmit downlink control information.

NB-IoT defines the following channels in an uplink direction:

Narrowband physical uplink shared channel (NPUSCH), used to transmit uplink user data using NPUSCH format 1 and transmit uplink control information using NPUSCH format 2, for example, a positive or negative acknowledgment, namely, ACK/NACK, for an NPDSCH. The NPUSCH format 1 and NPUSCH format 2 both support 3.75 kHz subcarrier spacing (in this case, one PRB with a bandwidth of 180 kHz may have 48 subcarriers) and 15 kHz subcarrier spacing (in this case, one PRB with a bandwidth of 180 kHz may have 12 subcarriers).

Narrowband physical random access channel (NPRACH), used to transmit a random access request.

NB-IoT maps an NPUSCH to a resource element (RE) through a resource allocation unit (Resource Unit, RU). One RU occupies $N_{slots}^{UL}$ consecutive slots or $N_{symb}^{UL} N_{slots}^{UL}$ consecutive SC-FDMA symbols ($N_{symb}^{UL}=7$ is the number of SC-FDMA symbols occupied by each slot) in the time domain, and occupies $N_{sc}^{RU}$ consecutive subcarriers in the frequency domain. Possible combinations of $N_{sc}^{RU}$, $N_{slots}^{UL}$, and $N_{symb}^{UL}$ are shown in Table 1:

TABLE 1

| | Definition of RU in NB-IoT | | | |
|---|---|---|---|---|
| NPUSCH format | Subcarrier spacing (Δf) | Number of subcarriers occupied by each RU ($N_{sc}^{RU}$) | Number of slots occupied by each RU ($N_{slots}^{UL}$) | Number of symbols occupied by each slot ($N_{symb}^{UL}$) |
| 1 | 3.75 kHz | 1 | 16 | 7 |
|   | 15 kHz | 1 | 16 | |
|   |         | 3 | 8  | |
|   |         | 6 | 4  | |
|   |         | 12 | 2 | |
| 2 | 3.75 kHz | 1 | 4 | |
|   | 15 kHz  | 1 | 4 | |

One NPUSCH transmission may include one or a plurality of RUs. For the NPUSCH format 2, each RU occupies only 1 subcarrier in the frequency domain, and occupies only 4 SC-FDMA symbols in the time domain (in this case, for the 3.75 kHz subcarrier spacing, the duration of the RU is 8 ms, and for the 15 kHz subcarrier spacing, the duration of the RU is 2 ms).

A downlink frame structure of NB-IoT FDD is the same as that of LTE. One radio frame (also called a "system frame," the frame number of which is called system frame number (SFN)) has a length of 10 ms consisting of 10 subframes each with a length of 1 ms, and each subframe further consists of 2 slots each with a length of 0.5 ms. Only "NB-IoT DL subframes" can be used to transmit an NPDCCH and an NPDSCH. Which specific subframes are NB-IoT DL subframes depends on high-layer configuration.

As described earlier, NB-IoT FDD supports both 3.75 kHz subcarrier spacing and 15 kHz subcarrier spacing in the uplink. In the case of 15 kHz subcarrier spacing, the frame structure of NB-IoT FDD is completely the same as that of LTE; that is, a radio frame length is 10 ms, a subframe length is 1 ms, and a slot length is 0.5 ms. In the case of 3.75 kHz subcarrier spacing, the length of a radio frame is 10 ms (which is the same as that of LTE), but the length of one slot is 2 ms (which is different from that of LTE). Only "NB-IoT UL slots" can be used to transmit an NPUSCH. In the case of 3.75 kHz subcarrier spacing, the concept of subframe is usually not used, because one slot is as long as 2 ms, where the concept of 1 ms subframe is no longer applicable.

The downlink user data transmission process of NB-IoT is roughly as follows:

1. UE receives downlink control information (DCI) transmitted by an eNB and carried on an NPDCCH channel. The DCI includes information instructing resource allocation of an NPDSCH channel carrying user data, for example, subcarrier allocation in the frequency domain, and a start time and a length in the time domain. The DCI further includes information instructing resources allocated to the user for transmitting a positive or negative acknowledgment (ACK/NACK) (acknowledgment message transmission resources or ACK/NACK resources for short below). It should be understood that channel transmission resources herein include time- and frequency-domain resources.

2. The UE receives an NPDSCH channel on the allocated time- and frequency-domain resources.

3. The UE transmits an ACK/NACK for NPDSCH reception on the allocated time- and frequency-domain resources.

For NB-IoT FDD, the ACK/NACK resource allocation mechanism is as follows:

Assuming that the NPDSCH transmitted by the eNB to the UE ends at subframe n (that is, the last subframe of the NPDSCH is subframe n), the UE should start transmitting the NPUSCH format 2 that carries ACK/NACK information about the NPDSCH after the end of subframe $n+k_0-1$.

For the 3.75 kHz subcarrier spacing, the value of $k_0$ in the time domain may be a value in the set $\{13, 21\}$, and an allocatable subcarrier number in the frequency domain may be a value in the set $\{38, 39, 40, 41, 42, 43, 44, 45\}$. Specifically, $k_0$ and the subcarrier number are allocated through Table 2, and are instructed in the ACK/NACK resource ("ACK/NACK resource field") field in DCI (see the first column of the table). Two possible values 13 and 21 of $k_0$ correspond to a spacing of 8 subframes, namely, 8 ms, which is exactly the duration of one RU.

TABLE 2

ACK/NACK resource allocation (3.75 kHz subcarrier spacing, FDD)

| ACK/NACK resource field in DCI | ACK/NACK subcarrier | $k_0$ |
| --- | --- | --- |
| 0 | 38 | 13 |
| 1 | 39 | 13 |
| 2 | 40 | 13 |
| 3 | 41 | 13 |
| 4 | 42 | 13 |
| 5 | 43 | 13 |
| 6 | 44 | 13 |
| 7 | 45 | 13 |

TABLE 2-continued

ACK/NACK resource allocation (3.75 kHz subcarrier spacing, FDD)

| ACK/NACK resource field in DCI | ACK/NACK subcarrier | $k_0$ |
| --- | --- | --- |
| 8 | 38 | 21 |
| 9 | 39 | 21 |
| 10 | 40 | 21 |
| 11 | 41 | 21 |
| 12 | 42 | 21 |
| 13 | 43 | 21 |
| 14 | 44 | 21 |
| 15 | 45 | 21 |

For the 15 kHz subcarrier spacing, the value of $k_0$ in the time domain may be a value in the set $\{13, 15, 17, 18\}$, and an allocatable subcarrier number in the frequency domain may be a value in the set $\{0, 1, 2, 3\}$. Specifically, $k_0$ and the subcarrier number are allocated through Table 3, and are instructed in the ACK/NACK resource ("ACK/NACK resource field") field in DCI (see the first column of the table). The possible values 13 and 15 of $k_0$ have a difference of 2, and 15 and 17 also have a difference of 2, which is exactly the length of one RU. The difference between 18 and 17 is not 2, but this enables the eNB to, when end subframes (n) of NPDSCHs of two UEs have a difference being an odd number of subframes, schedule ACK/NACKs thereof to start at the same time, and further allocate different subcarriers in the frequency domain to the two UEs, which can maximize the utilization of uplink time-frequency resources.

TABLE 3

ACK/NACK resource allocation (15 kHz subcarrier spacing, FDD)

| ACK/NACK resource field in DCI | ACK/NACK subcarrier | $k_0$ |
| --- | --- | --- |
| 0 | 0 | 13 |
| 1 | 1 | 13 |
| 2 | 2 | 13 |
| 3 | 3 | 13 |
| 4 | 0 | 15 |
| 5 | 1 | 15 |
| 6 | 2 | 15 |
| 7 | 3 | 15 |
| 8 | 0 | 17 |
| 9 | 1 | 17 |
| 10 | 2 | 17 |
| 11 | 3 | 17 |
| 12 | 0 | 18 |
| 13 | 1 | 18 |
| 14 | 2 | 18 |
| 15 | 3 | 18 |

Figure 1:
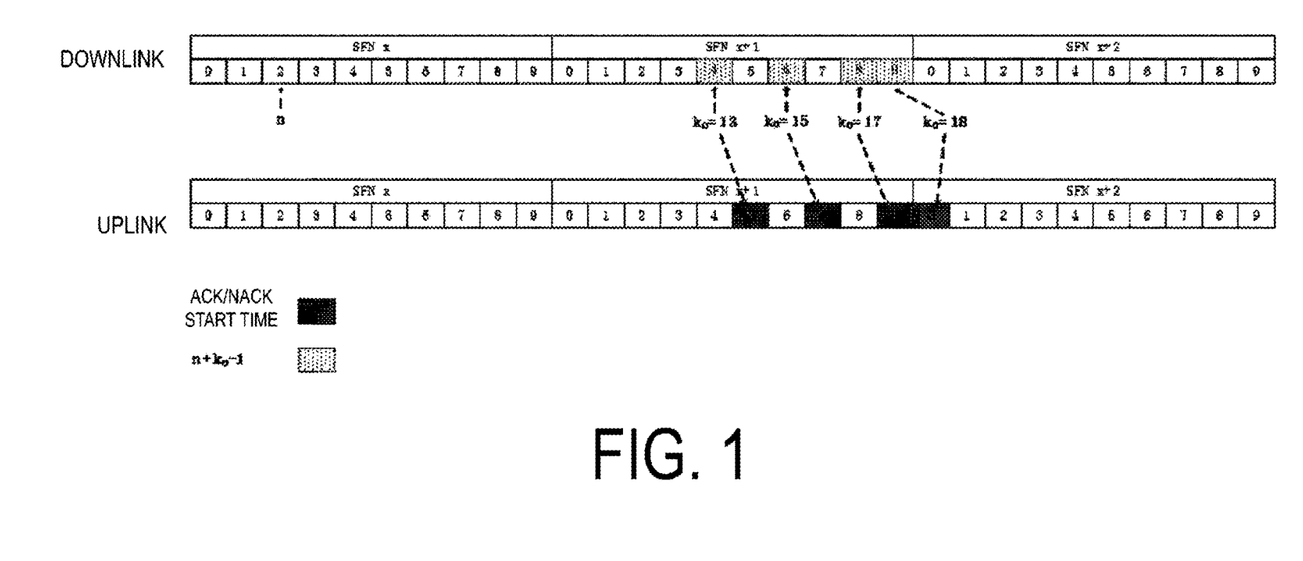
FIG. 1 illustrates an example of an ACK/NACK resource allocation mechanism in an FDD mode.

The aforementioned ACK/NACK resource allocation mechanism in the FDD mode in the time domain is shown in FIG. 1 (using 15 kHz subcarrier spacing as an example). The end subframe (n) of the NPDSCH and the corresponding start time for ACK/NACK transmission are spaced apart by at least 12 ms (corresponding to $k_0=13$), so as to allow enough time for the UE to decode the NPDSCH.

According to the aforementioned ACK/NACK resource allocation mechanism in the NB-IoT FDD mode, if the NPDSCH ends at subframe n, then the UE should start transmitting the ACK/NACK after the end of subframe $n+k_0-1$. For FDD, because each uplink subframe directly corresponds to one downlink subframe with the same number, the ACK/NACK can be directly transmitted on a next uplink subframe (namely, subframe $n+k_0$) after the end of the downlink subframe $n+k_0-1$. For example, in FIG. 1, if the end subframe of the NPDSCH is n, and $k_0=13$, then subframe $n+k_0-1$ is a subframe 4 of SFN x+1, and transmission of the ACK/NACK can start on an uplink subframe 5 of the same SFN.

Figure 2:
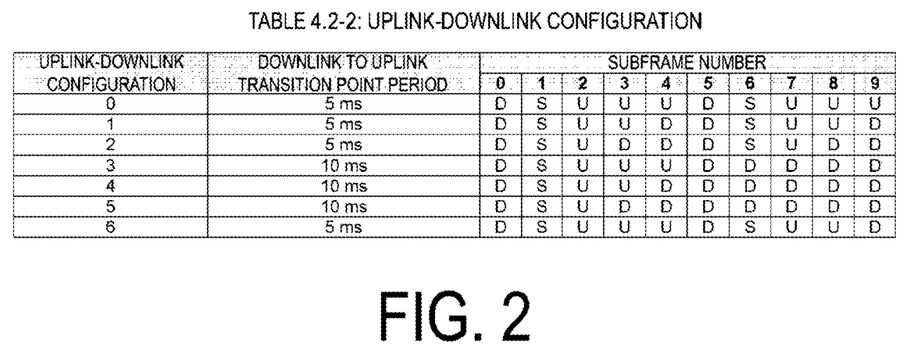
FIG. 2 illustrates a possible uplink configuration mechanism in TDD.

However, in TDD, uplink and downlink subframes are numbered together, and a subframe can be only one of an uplink subframe (marked as "U" in FIG. 2), a downlink subframe (marked as "D" in FIG. 2), and a special subframe (marked as "S" in FIG. 2 and used for switching from the downlink to the uplink). FIG. 2 illustrates possible uplink configurations in TDD. If the NPDSCH ends at a downlink subframe n, then a subframe (subframe $n+k_0$) immediately after the end of subframe $n+k_0-1$ may be an uplink subframe, a downlink subframe, or a special subframe. Because only an uplink subframe can be used to transmit the ACK/NACK, subframe $n+k_0$ may not be capable of transmitting the ACK/NACK. Following the FDD rules, the transmission of the ACK/NACK should start from the first "NB-IoT uplink slot (NB-IoT UL slot)" after the end of $n+k_0-1$. This means if the FDD rules are copied in TDD, then in the worst case, a plurality of possible positions of $n+k_0-1$ will correspond to the same "NB-IoT uplink slot," while few other possible positions of $n+k_0-1$ correspond to other "NB-IoT uplink slots," which greatly reduces the flexibility of the eNB in allocating ACK/NACK time-domain resources. In fact, an additional time offset $\{0, 2, 4, 5\}$ ms in addition to 12 ms is designed in FDD (using 15 kHz subcarrier spacing as an example) in order to separate the allocated ACK/NACK resources temporally at the granularity of slots, and if the design of FDD is directly applied to TDD, then the ACK/NACK resources cannot be separated at the granularity of slots.

Figure 3:
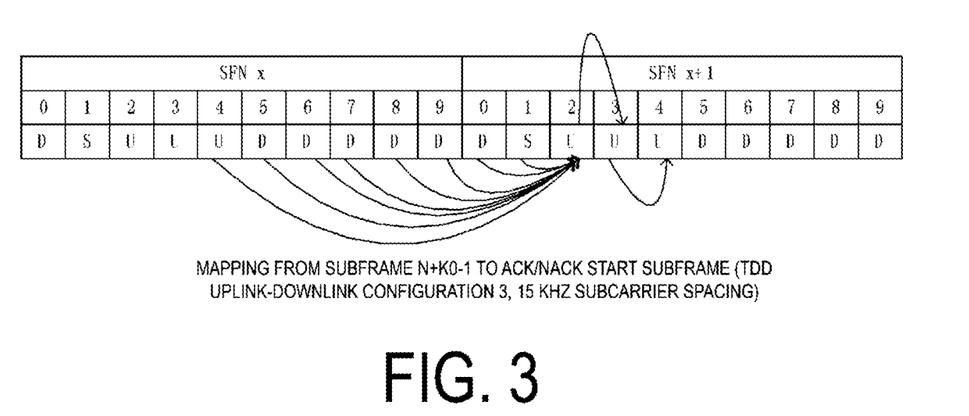
FIG. 3 illustrates a schematic diagram of a possible result of reusing in TDD the ACK/NACK resource allocation mechanism in FDD.

FIG. 3 illustrates an example of TDD uplink-downlink configuration 3 with 15 kHz subcarrier spacing (see FIG. 2). It can be seen that if the FDD rules are followed (that is, the transmission of the ACK/NACK needs to start from the first "NB-IoT uplink slot" after the end of $n+k_0-1$), then in TDD, eight possible positions in ten possible positions (for example, the start positions of the arrows) of $n+k_0-1$ correspond to an ACK/NACK start position (for example, the position that the arrows point to) being a subframe 2, and only two remaining possible positions respectively correspond to ACK/NACK start positions being subframes 3 and 4. In addition, if $k_0=13$ corresponds to a subframe 4 of SFN x, then other $k_0$s respectively correspond to subframes 6 ($k_0=15$), 8 ($k_0=17$), and 9 ($k_0=18$) of SFN x. That is, all four possible $k_0$s correspond to the same ACK/NACK start position, namely, subframe 2 of SFN x+1, which absolutely cannot achieve the purpose of separating the ACK/NACK resources in the time domain via different $k_0$ values.

Based on the above analysis, it can be seen that the existing ACK/NAC resource allocation mechanism in FDD does not apply to TDD.

Accordingly, embodiments of the present invention provide an ACK/NACK resource allocation scheme applicable to an NB-IoT TDD cell, and the scheme can flexibly allocate uplink time-frequency resources to user equipment for transmitting an ACK/NACK for an NPDSCH. Specific description is provided below with reference to the accompanying drawings.

Figure 4:
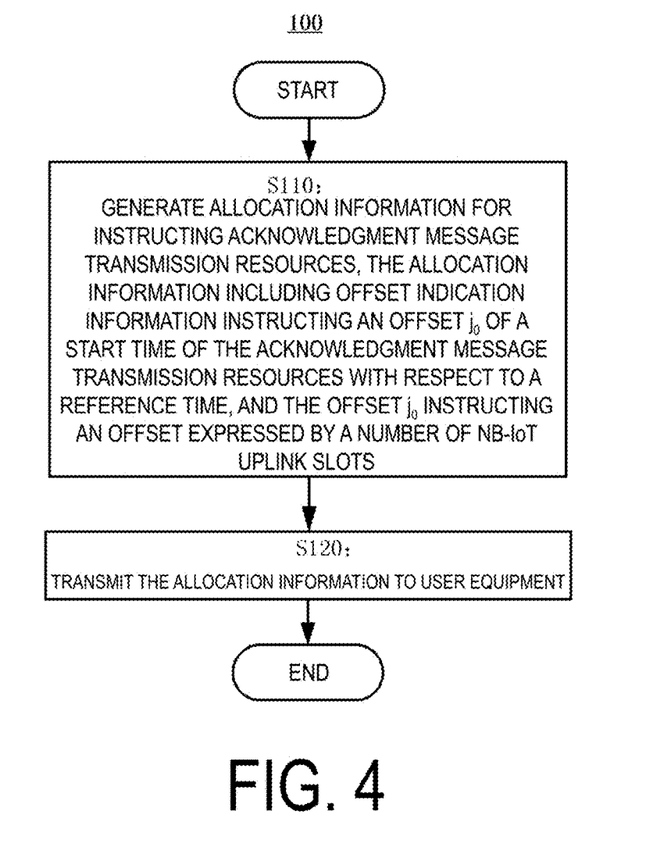
FIG. 4 schematically illustrates a flowchart of an operation of a method for allocating acknowledgment message transmission resources at a base station according to an embodiment of the present disclosure.

FIG. 4 schematically illustrates a flowchart of an operation 100 of a method for allocating acknowledgment message transmission resources at a base station according to an embodiment of the present disclosure.

As shown in the figure, step S110: generate allocation information for instructing acknowledgment message transmission resources. The allocation information includes offset indication information instructing an offset $j_0$ of a start time of the acknowledgment message transmission resources with respect to a reference time. The offset $j_0$ instructs an offset expressed by a number of NB-IoT uplink slots or an equivalent thereof, for example, the number of milliseconds corresponding to an offset expressed by a number of NB-IoT uplink slots.

Step S120: transmit the allocation information to user equipment.

The acknowledgment message is, for example, an ACK/NACK for an NPDSCH. As described earlier, in NB-IoT, the ACK/NACK is transmitted using the NPUSCH format 2 (see Table 1). The acknowledgment message transmission resources refer to time-frequency resources for transmitting an acknowledgment message (such as ACK/NACK), and include time-domain resources and frequency-domain resources. This embodiment of the present disclosure mainly focuses on allocation of the time-domain resources for transmitting the acknowledgment message. Allocation of the frequency-domain resources for transmitting the acknowledgment message may be similar to allocation of frequency-domain resources for transmitting an acknowledgment message in FDD, or may use other proper schemes, which will not be further discussed herein.

The allocation information for instructing the acknowledgment message transmission resources may include allocation information of the time-domain resources for transmitting the acknowledgment message (called time-domain allocation information for short) and allocation information of the frequency-domain resources for transmitting the acknowledgment message (called frequency-domain allocation information for short).

The time-domain allocation information may include, for example, offset indication information instructing an offset $j_0$ of a start time of the acknowledgment message transmission resources with respect to a reference time. The reference time is related to the time of downlink transmission (for example, an NPDSCH) to be acknowledged, for example, a fixed time after an end subframe of the NPDSCH to be acknowledged. The fixed time may be determined according to capability of the user equipment, for example, the minimum time required by the user equipment to decode the NPDSCH, for example, 12 ms or other time enough to ensure decoding of the NPDSCH by the UE. The offset $j_0$ instructs an offset in a number of NB-IoT uplink slots with respect to the reference time. In the embodiment of the present invention, the time after the end subframe of the NPDSCH and the time after the reference time, for example, NB-IoT uplink slots or a duration (in milliseconds) corresponding to the NB-IoT uplink slots, are consecutively numbered (for example, from 0), where the numbering is performed across radio frames, not within each radio frame. It can be easily understood that in TDD, after uplink-downlink configuration is already determined (for example, one of the configurations in FIG. 2) and the reference time is also determined, numbers of uplink slots after the reference time are determined. For example, referring to the TDD uplink-downlink configuration 3 with 15 kHz subcarrier spacing (where one subframe corresponds to two slots) shown in FIG. 3, if the reference time is the end of a subframe 0 in SFN x, then all uplink slots corresponding to subframes 2, 3, and 4 in the radio frame SFN x and subframes 2, 3, and 4 in SFN x+1 may be sequentially numbered 0, 1, 2, 3, 4, 5, 6, 7, 8, 9, 10, and 11; if the reference time is the end of a subframe 5 in SFN x, then uplink slots corresponding to subframes 2, 3, and 4 in the radio frame SFN x+1 may be respectively numbered 0, 1, 2, 3, 4, and 5.

As an example, in a preferred embodiment, the reference time is N milliseconds (N=12 or other integers) after the end of the end subframe of the NPDSCH, and if the end subframe of the NPDSCH to be acknowledged is n, then the offset $j_0$ can instruct starting acknowledgment message transmission from a $j_0^{th}$ NB-IoT uplink slot after the end of subframe n+N. In this embodiment, the subframe numbers are cross-radio frame, not 0 to 9 in a single radio frame, and the slot numbers are cross-subframe and cross-radio frame.

The frequency-domain allocation information may include, for example, information instructing numbers of subcarriers allocated for acknowledgment message transmission.

In some implementations, the time-domain allocation information and the frequency-domain allocation information may be jointly instructed. For example, like ACK/NACK resource allocation in FDD (for example, see Table 2 and Table 3), an index for joint allocation of the time-domain resources and the frequency-domain resources is instructed in DCI. Alternatively, in other embodiments, the time-domain allocation information and the frequency-domain allocation information may be separately instructed.

The allocation information may be carried by DCI, for example, carried in an existing field, an ACK/NACK resource field in DCI as in FDD or carried in another existing or new field in DCI. In the embodiment in which the time-domain allocation information and the frequency-domain allocation information are jointly instructed, the DCI may carry, for example, an index for joint allocation instructing time-domain and frequency-domain resources for acknowledgment message transmission, for example, an index for joint allocation of the offset $j_0$ of an allocated time point of starting acknowledgment message transmission with respect to the reference time and subcarriers allocated for acknowledgment message transmission. In the embodiment in which the time-domain allocation information and the frequency-domain allocation information are separately instructed, the DCI may include, for example, information instructing an offset $j_0$ of an allocated time point of starting acknowledgment message transmission with respect to the reference time, and the information may be a value of $j_0$ or an index thereof.

As described earlier, in NB-IoT, the ACK/NACK is transmitted using the NPUSCH format 2 (see Table 1). The NPUSCH format 2 corresponds to two types of subcarrier spacing, which are respectively 3.75 kHz and 15 kHz. Optionally, in the case in which the ACK/NACK transmission uses the 3.75 kHz subcarrier spacing, the value set of the offset $j_0$ may be one of the following sets: {0, 4}, {0, 3}, {0, 2}, and {0, 1}. In the case in which the acknowledgment message transmission uses the 15 kHz subcarrier spacing, the value set of the offset $j_0$ may be one of the following sets: {0, 4, 8, 10}, {0, 4, 8, 12}, {0, 2, 8, 10}, {0, 2, 8, 12}, {0, 2, 4, 6}, {0, 2, 4, 8}, {0, 2, 4, 10}, {0, 2, 4, 12}, {0, 2, 6, 8}, {0, 2, 6, 10}, {0, 2, 6, 12}, {0, 6, 8, 10}, {0, 6, 8, 12}, {0, 4, 6, 8}, {0, 4, 6, 10}, {0, 4, 6, 12}, and {0, 8, 10, 12}.

It should be understood that in some embodiments, all uplink slots may be configured as NB-IoT uplink slots; in some other embodiments, part or all of the uplink slots may be configured as NB-IoT uplink slots; by default, all uplink slots may be considered to be configured as NB-IoT uplink slots in the absence of configuration.

Besides, in some embodiments, all uplink subframes, for example, all subframes marked as "U" in FIG. 2 are used to transmit NB-IoT uplink slots; in some embodiments, part or all of the uplink subframes may be configured to be used to transmit NB-IoT uplink slots; by default, all uplink subframes may be considered to be used to transmit NB-IoT uplink slots in the absence of configuration.

The scheme for allocating acknowledgment message transmission resources in the present invention is set forth below through two specific implementations.

Scheme 1

The DCI includes an "ACK/NACK resource" field used to allocate to user equipment (UE) ACK/NACK uplink resources for an NPDSCH, and each value of the field corresponds to one time offset $j_0$; if the UE detects that the NPDSCH provided by a base station (for example, an eNB) to the UE ends at subframe n, then the ACK/NACK transmitted by the UE for the NPDSCH should start from a $j_0^{th}$ NB-IoT uplink slot after the end of subframe n+12.

In the case in which the transmission of the ACK/NACK uses 3.75 kHz subcarrier spacing, $j_0$ may take a value from the set {0, 4}, where one example is shown in Table 4; alternatively, $j_0$ may take a value from the set {0, 3}; alternatively, $j_0$ may take a value from the set {0, 2}; alternatively, $j_0$ in may take a value from the set {0, 1}.

TABLE 4

ACK/NACK resource allocation (3.75 kHz subcarrier spacing, TDD)

| ACK/NACK resource field | ACK/NACK subcarrier | $j_0$ |
|---|---|---|
| 0 | 38 | 0 |
| 1 | 39 | 0 |
| 2 | 40 | 0 |
| 3 | 41 | 0 |
| 4 | 42 | 0 |
| 5 | 43 | 0 |
| 6 | 44 | 0 |
| 7 | 45 | 0 |
| 8 | 38 | 4 |
| 9 | 39 | 4 |
| 10 | 40 | 4 |
| 11 | 41 | 4 |
| 12 | 42 | 4 |
| 13 | 43 | 4 |
| 14 | 44 | 4 |
| 15 | 45 | 4 |

In the case in which the transmission of the ACK/NACK uses 15 kHz subcarrier spacing, $j_0$ may take a value from the set {0, 4, 8, 10}, where one example is shown in Table 5; alternatively, $j_0$ may take a value from the set {0, 4, 8, 12}; alternatively, $j_0$ may take a value from the set {0, 2, 8, 10}; alternatively, $j_0$ may take a value from the set {0, 2, 8, 12}; alternatively, $j_0$ may take a value from the set {0, 2, 4, 6}; alternatively, $j_0$ may take a value from the set {0, 2, 4, 8}; alternatively, $j_0$ may take a value from the set {0, 2, 4, 10}; alternatively, $j_0$ may take a value from the set {0, 2, 4, 12}; alternatively, $j_0$ may take a value from the set {0, 2, 6, 8}; alternatively, $j_0$ may take a value from the set {0, 2, 6, 10}; alternatively, $j_0$ may take a value from the set {0, 2, 6, 12}; alternatively, $j_0$ may take a value from the set {0, 6, 8, 10}; alternatively, $j_0$ may take a value from the set {0, 6, 8, 12}; alternatively, $j_0$ may take a value from the set {0, 4, 6, 8}; alternatively, $j_0$ may take a value from the set {0, 4, 6, 10};

alternatively, $j_0$ may take a value from the set $\{0, 4, 6, 12\}$; alternatively, $j_0$ may take a value from the set $\{0, 8, 10, 12\}$.

TABLE 5

ACK/NACK resource allocation (15 kHz subcarrier spacing, TDD)

| ACK/NACK resource field | ACK/NACK subcarrier | $j_0$ |
|---|---|---|
| 0 | 0 | 0 |
| 1 | 1 | 0 |
| 2 | 2 | 0 |
| 3 | 3 | 0 |
| 4 | 0 | 4 |
| 5 | 1 | 4 |
| 6 | 2 | 4 |
| 7 | 3 | 4 |
| 8 | 0 | 8 |
| 9 | 1 | 8 |
| 10 | 2 | 8 |
| 11 | 3 | 8 |
| 12 | 0 | 10 |
| 13 | 1 | 10 |
| 14 | 2 | 10 |
| 15 | 3 | 10 |

Scheme 2

Scheme 2 is similar to Scheme 1, but has the following changes:

when subframe n+12 is an even number, the actual value of j0 is a corresponding element of an indication value thereof in a value set; when subframe n+12 is an odd number, the actual value of j0 is a next element of a corresponding element of an indication value thereof in a value set (looping through all the elements of the set). For example, in the scheme corresponding to Table 5, a value set of j0 is $\{0, 4, 8, 10\}$. When j0=0, the next element is j0=4; when j0=4, the next element is j0=8; when j0=8, the next element is j0=10; and when j0=10, the next element is j0=0. For example, for the 15 kHz subcarrier spacing, two pieces of UE are respectively allocated with j0=0; however, for UE1, n+12 is an even number, and for UE2, n+12 is an odd number. Therefore, for the UE1, the actual value of j0 is 0; for the UE2, the actual value of j0 is 4.

Alternatively, when subframe n+12 is an odd number, the actual value of j0 is a corresponding element of an indication value thereof in a value set; when subframe n+12 is an even number, the actual value of j0 is a next element of a corresponding element of an indication value thereof in a value set (looping through all the elements of the set). For example, for the 15 kHz subcarrier spacing, two pieces of UE are respectively allocated with j0=0; however, for UE1, n+12 is an even number, and for UE2, n+12 is an odd number. Therefore, for the UE1, the actual value of j0 is 4; for the UE2, the actual value of j0 is 0.

Figure 5:
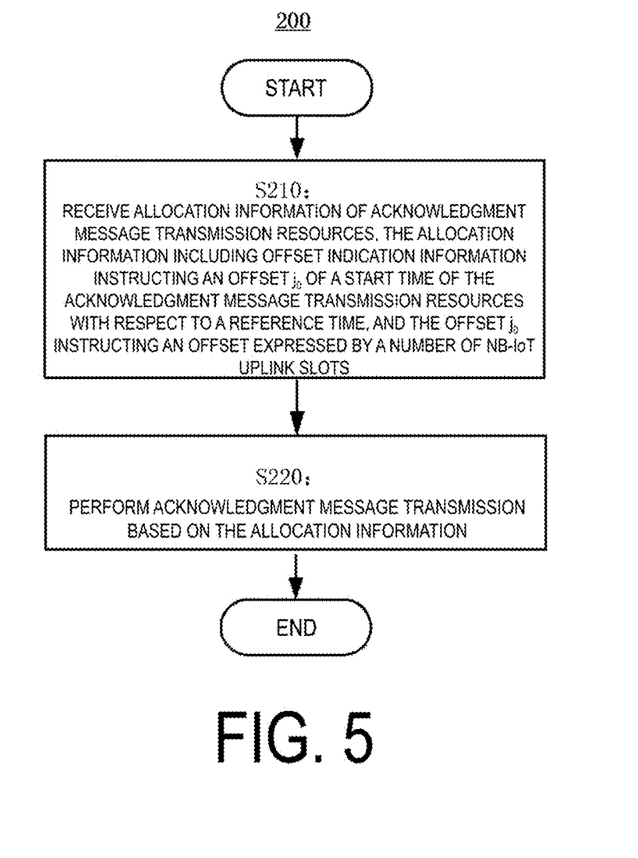
FIG. 5 schematically illustrates a flowchart of an operation of a method for allocating acknowledgment message transmission resources performed at user equipment according to an embodiment of the present disclosure.

FIG. 5 schematically illustrates a flowchart of an operation 200 of a method for allocating acknowledgment message transmission resources at user equipment according to an embodiment of the present disclosure.

As shown in the figure, step S210: receive allocation information of acknowledgment message transmission resources, the allocation information including offset indication information instructing an offset $j_0$ of a start time of the acknowledgment message transmission resources with respect to a reference time, and the offset $j_0$ instructing an offset expressed by a number of uplink slots.

Step S220: perform acknowledgment message transmission based on the allocation information.

The user equipment may receive the allocation information of the acknowledgment message transmission resources from a network side, for example, a base station. Time-frequency resources allocated for acknowledgment message transmission are determined according to the allocation information. The allocation information has been described in detail above with reference to the operation of the base station in FIG. 4, and will not be described in detail herein.

In some embodiments, the offset $j_0$ instructs starting acknowledgment message transmission from a $j_0^{th}$ uplink slot after the end of subframe n+N, where subframe n is an end subframe of downlink transmission to be acknowledged, and N=12 or other integers.

In some embodiments, the offset indication information is an index for joint allocation of the offset $j_0$ and subcarriers allocated for acknowledgment message transmission.

In some embodiments, in the case in which the acknowledgment message transmission uses the 3.75 kHz subcarrier spacing, the value set of the offset $j_0$ may be one of the following sets: $\{0, 4\}$, $\{0, 3\}$, $\{0, 2\}$, and $\{0, 1\}$.

In some embodiments, in the case in which the acknowledgment message transmission uses the 15 kHz subcarrier spacing, the value set of the offset $j_0$ may be one of the following sets: $\{0, 4, 8, 10\}$, $\{0, 4, 8, 12\}$, $\{0, 2, 8, 10\}$, $\{0, 2, 8, 12\}$, $\{0, 2, 4, 6\}$, $\{0, 2, 4, 8\}$, $\{0, 2, 4, 10\}$, $\{0, 2, 4, 12\}$, $\{0, 2, 6, 8\}$, $\{0, 2, 6, 10\}$, $\{0, 2, 6, 12\}$, $\{0, 6, 8, 10\}$, $\{0, 6, 8, 12\}$, $\{0, 4, 6, 8\}$, $\{0, 4, 6, 10\}$, $\{0, 4, 6, 12\}$, and $\{0, 8, 10, 12\}$.

Figure 6:
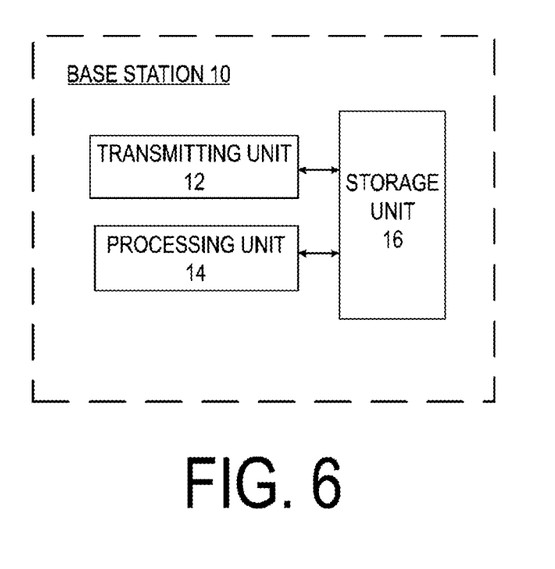
FIG. 6 schematically illustrates a schematic structural diagram of user equipment according to an embodiment of the present disclosure.

FIG. 6 is a schematic block diagram of a base station 10 according to an embodiment of the present disclosure. As shown in the figure, the base station 10 may include a transmitting unit 12 and a processing unit 14. Optionally, the base station 10 may further include a storage unit 16 and the like.

The processing unit 14 may be configured to generate allocation information for instructing acknowledgment message transmission resources. The allocation information includes offset indication information instructing an offset $j_0$ of a start time of the acknowledgment message transmission resources with respect to a reference time. The offset $j_0$ instructs an offset expressed by a number of uplink slots or an equivalent thereof.

The transmitting unit 12 may be configured to transmit the allocation information to user equipment.

Figure 7:
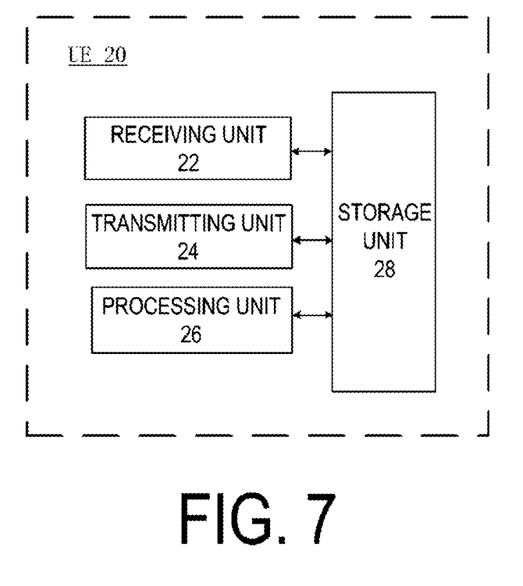
FIG. 7 schematically illustrates a schematic structural diagram of a base station according to an embodiment of the present disclosure.

FIG. 7 is a schematic block diagram of user equipment (UE) 20 according to an embodiment of the present disclosure. As shown in the figure, the user equipment 20 may include a receiving unit 22 and a transmitting unit 24. Optionally, the UE 20 may further include other units, for example, a processing unit 26, a storage unit 28, and the like. It should be understood that the processing unit 26 and the storage unit 28 may be separate units, or may be integrated in the receiving unit 22 and/or transmitting unit 24. Besides, it should be understood that although the figure illustrates that the receiving unit 22 and the transmitting unit 24 are separate units, they may be integrated together in other embodiments.

The receiving unit 22 may be configured to receive allocation information of acknowledgment message transmission resources. The allocation information includes offset indication information instructing an offset j0 of a start time of the acknowledgment message transmission resources with respect to a reference time. The offset j0 instructs an offset expressed by a number of uplink slots.

The transmitting unit 24 may be configured to perform acknowledgment message transmission based on the allocation information.

The base station 10 according to the embodiment of the present invention may be configured to perform the aforementioned method 100. The user equipment 20 according to the embodiment of the present invention may be configured to perform the aforementioned method 200. For the specific operation of the user equipment and the base station, reference may be made to the above description about the methods, which will not be described herein again.

Those skilled in the art should understand that only components related to the present disclosure are shown in the base station and/or user equipment in FIG. 6 and FIG. 7 to avoid confusion of the present disclosure. However, those skilled in the art should understand that although not shown in the figures, the base station and/or user equipment according to the embodiments of the present disclosure may further include other basic units that make up the base station and/or user equipment.

Figure 8:
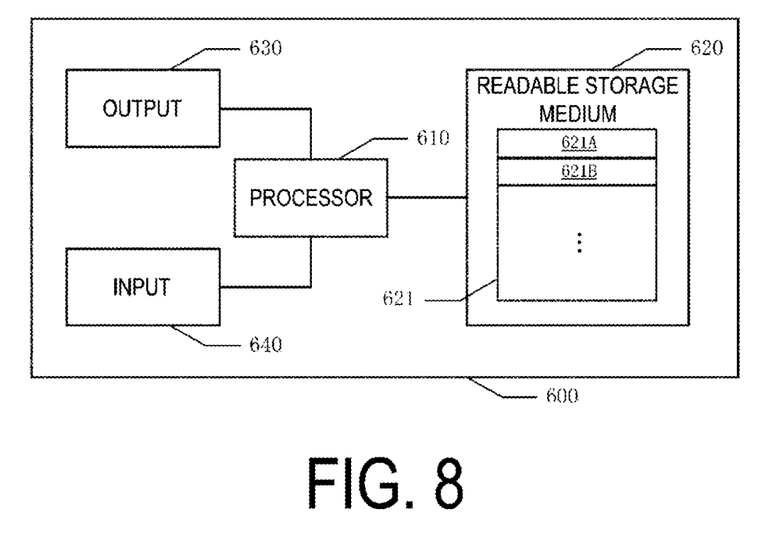
FIG. 8 schematically illustrates a block diagram of a computing system according to an embodiment of the present disclosure that can implement the base station or user equipment in the present disclosure.

FIG. 8 schematically illustrates a block diagram of a computing system according to an embodiment of the present disclosure that can implement the base station or user equipment in the present disclosure.

As shown in FIG. 8, the computing system 600 includes a processor 610, a computer-readable storage medium 620, an output interface 630, and an input interface 640. The computing system 600 may perform the method 100 or 200 described above with reference to FIG. 4 or FIG. 5 to fulfill acknowledgment message (ACK/NACK) resource allocation applicable to an NB-IoT TDD cell.

Specifically, the processor 610 may include, for example, a general-purpose microprocessor, an instruction set processor and/or a related chip set and/or a special-purpose microprocessor (for example, an application specific integrated circuit (ASIC)). The processor 610 may further include an on-board memory for caching purposes. The processor 610 may be a single processing unit or a plurality of processing units for performing various actions of the method flow described with reference to FIG. 4 or FIG. 5.

The computer-readable storage medium 620 may be, for example, any medium capable of containing, storing, transferring, propagating, or transmitting instructions. For example, the readable storage medium may include, but is not limited to, electrical, magnetic, optical, electromagnetic, infrared, or semiconductor systems, devices, components, or propagation media. Specific examples of the readable storage medium include: a magnetic storage device such as a magnetic tape or a hard drive disc (HDD); an optical storage device such as a compact disc read-only memory (CD-ROM); a memory such as a random access memory (RAM) or a flash memory; and/or a wired/wireless communication link.

The computer-readable storage medium 620 may include a computer program 621, where the computer program 621 may include code/computer-executable instructions that, when executed by the processor 610, cause the processor 610 to perform, for example, the method flows described above with reference to FIG. 4 and FIG. 5 and any variations thereof.

The computer program 621 may be configured to have, for example, computer program code including computer program modules. For example, in an exemplary embodiment, the code in the computer program 621 may include one or a plurality of program modules, for example, include 621A, a module 621B, . . . . It should be noted that the division and the number of the modules are not fixed. Those skilled in the art can use proper program modules or program module combinations according to the actual situation. When executed by the processor 610, the program module combinations cause the processor 610 to perform the method flows described above with reference to FIG. 4 and FIG. 5 or any variations thereof.

According to the embodiment of the present disclosure, the processor 610 may use the output interface 630 and the input interface 640 to perform the method flows described above with reference to FIG. 4 and FIG. 5 and any variations thereof.

The present disclosure further provides at least one computer storage medium in the form of a non-volatile or volatile memory, such as an electrically erasable programmable read-only memory (EEPROM), a flash memory, and a hard disk drive. When executed by the processing unit 14, the computer-executable instructions cause the base station 10 to perform, for example, the action of the process 100 described before with reference to FIG. 4, or when executed by the processing unit 26, the computer-executable instructions cause the user equipment 20 to perform, for example, the action of the process 200 described before with reference to FIG. 5.

The processor may be a single CPU (central processing unit), but may also include two or more processors. For example, the processor may include a general-purpose microprocessor, an instruction set processor and/or a related chip set and/or a special-purpose microprocessor (for example, an application specific integrated circuit (ASIC)). The processor may also include an on-board memory for caching purposes. For example, the computer storage medium may be a flash memory, a random access memory (RAM), a read-only memory (ROM), or an EEPROM.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions can be achieved by the computer system through reading programs recorded on the recording medium and executing them. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other computer-readable recording medium.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be an existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

The methods and related devices according to the present disclosure have been described above in conjunction with preferred embodiments. The present disclosure provides an acknowledgment message (ACK/NACK) resource allocation scheme applicable to an NB-IoT TDD cell, and the scheme can flexibly allocate uplink time-frequency resources to user equipment for transmitting an ACK/NACK for an NPDSCH.

Besides, a new work item on even further enhanced machine type communication (MTC) (see non-patent literature: RP-170732: New WID on Even further enhanced MTC for LTE, efeMTC for short) was approved at the 3rd Generation Partnership Project (3GPP) RAN #75 plenary meeting held in March 2017. One of the goals of the research project is to support resource allocation based on sub-physical resource blocks (sub-PRBs) (namely, support resource allocation based on less than one PRB) so as to improve the spectral efficiency of a physical uplink shared channel of MTC.

In the existing 3GPP standard specifications related to MTC, MTC UE in an RRC connected state supports two coverage enhancement modes: a coverage enhancement mode A (CE mode A) and a coverage enhancement mode B (CE mode B). The coverage enhancement mode A is used for UE having good channel conditions, not requiring coverage enhancement or requiring small coverage enhancement, and not requiring repeated transmission or requiring quite few repeated transmissions; the coverage enhancement mode B is used for UE having poor channel conditions, requiring large or quite large coverage enhancement, or requiring many or quite many repeated transmissions. In the coverage enhancement mode A, an eNB schedules uplink and downlink data transmission respectively through downlink control information (DCI) format 6-0A and downlink control information format 6-1A; in the coverage enhancement mode B, the eNB schedules uplink and downlink data transmission respectively through downlink control information (DCI) format 6-0B and downlink control information format 6-1B. Besides, in the existing 3GPP standard specifications related to MTC, the smallest resource allocation unit for a PUSCH is one physical resource block (PRB), namely, occupying a bandwidth of 12 subcarriers in the frequency domain; the subcarrier spacing in the existing LTE is 15 kHz; and the physical bandwidth of one PRB is 180 kHz. When the UE has poor channel conditions, to achieve the desired reception quality for a PUSCH, available methods include increasing the transmit power of the UE or increasing the number of repeated transmissions of the PUSCH. However, the UE has transmission power limits, or has maximum transmission power. For MTC UE having poor channel conditions or poor coverage, existing LTE systems already use the maximum transmission power. Research shows that for UE with poor coverage, reducing the resource allocation bandwidth (for example, changing the granularity of resource allocation from 12 subcarriers to 6 subcarriers or even 3 subcarriers or 1 subcarrier) and increasing power per unit frequency can effectively improve link performance of a PUSCH and enhance uplink spectral efficiency. This is called "sub-PRB" resource allocation.

The existing downlink control information format 6-0A and downlink control information format 6-0B support only resource allocation based on greater than or equal to 1 PRB.

In order to support "sub-PRB" resource allocation, the resource allocation mode in the downlink control information format 6-0B and/or downlink control information format 6-0A, for example, a "resource block assignment" field, needs to be enhanced, for example, to support both resource allocation based on greater than or equal to 1 PRB and "sub-PRB" resource allocation.

The following scheme solves the problem of how to enhance a repetition number field in DCI to support both resource allocation based on greater than or equal to 1 PRB and "sub-PRB" resource allocation.

UE may determine how to interpret one or a plurality of other fields in the DCI (such as a repetition number field) according to the allocation of frequency-domain resources in the DCI, such as whether the allocated frequency-domain resources are less than 1 PRB.

In some embodiments, the eNB configures, according to an RRC parameter, whether the UE enables sub-PRB resource allocation, and in the case in which sub-PRB resource allocation is enabled, a field in the DCI indicates whether sub-PRB resource allocation is currently performed (for example, through a "resource block assignment" field).

In some embodiments, whether sub-PRB resource allocation is currently performed is derived from frequency-domain resources implicitly or explicitly allocated via the "resource block assignment" field and/or other fields in the DCI. For example, if the allocated frequency-domain resources are 1 subcarrier or 3 subcarriers or 6 subcarriers, then it can be derived that "sub-PRB" resource allocation is currently being performed; otherwise, it can be derived that "sub-PRB" resource allocation is not currently performed.

In some embodiments, if sub-PRB resource allocation is not currently performed, then the repetition number field is interpreted in the existing manner; otherwise, if sub-PRB resource allocation is currently being performed, then the repetition number field is interpreted in a manner different from the existing manner, for example:

the number of resource units (RUs) occupied by PUSCH transmission is equal to the number of RUs allocated via the "resource block assignment" field and/or other fields in the DCI multiplied by the value of the "repetition number" field in the DCI. Further, the number of subframes occupied by PUSCH transmission is equal to the number of RUs occupied by PUSCH transmission multiplied by the number of subframes occupied by 1 RU. Or, the number N of subframes occupied by PUSCH transmission is selected from a set $\{n_1, n_2, \ldots, n_{max}\}$ according to the value of the repetition number field, and the determining manner of the set $\{n_1, n_2, \ldots, n_{max}\}$ is different from the existing manner. For example, the set $\{n_1, n_2, \ldots, n_{max}\}$ is a fixed set of constants, for example, $\{1, 2, 4, 8, 16, 32, 64, 128\}$; for another example, the set $\{n_1, n_2, \ldots, n_{max}\}$ is determined according to two different high-layer parameters respectively in the coverage enhancement mode A and the coverage enhancement mode B, but the content of the determined set is not exactly the same as that of the existing manner.

The repetition number field is interpreted in the existing manner, which refers to that the number N of subframes occupied by PUSCH transmission is selected from the set $\{n_1, n_2, \ldots, n_{max}\}$ according to the value of the repetition number field, and the set $\{n_1, n_2, \ldots, n_{max}\}$ is determined according to the following tables 0a and 0b respectively in the coverage enhancement mode A and the coverage enhancement mode B.

TABLE 0a

| PUSCH repetition number (DCI format 6-0A) | |
|---|---|
| High-layer parameter 'pusch-maxNumRepetitionCEmodeA' | {n1, n2, n3, n4} |
| Unconfigured | {1, 2, 4, 8} |
| 16 | {1, 4, 8, 16} |
| 32 | {1, 4, 16, 32} |

TABLE 0b

| PUSCH repetition number (DCI format 6-0B) | |
|---|---|
| High-layer parameter 'pusch-maxNumRepetitionCEmodeB' | {n1, n2, . . . , n8} |
| Unconfigured | {4, 8, 16, 32, 64, 128, 256, 512} |
| 192 | {1, 4, 8, 16, 32, 64, 128, 192} |
| 256 | {4, 8, 16, 32, 64, 128, 192, 256} |
| 384 | {4, 16, 32, 64, 128, 192, 256, 384} |
| 512 | {4, 16, 64, 128, 192, 256, 384, 512} |
| 768 | {8, 32, 128, 192, 256, 384, 512, 768} |
| 1024 | {4, 8, 16, 64, 128, 256, 512, 1024} |
| 1536 | {4, 16, 64, 256, 512, 768, 1024, 1536} |
| 2048 | {4, 16, 64, 128, 256, 512, 1024, 2048} |

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulting from the appropriate combinations of the technical means disclosed in different embodiments are also included within the technical scope of the present disclosure. In addition, components with the same effect described in the embodiments above may be replaced with one another.

The invention claimed is:

1. A method performed by a user equipment (UE), comprising;
   detecting, by the UE in an NB-IoT system supporting TDD, a NPDSCH ending in subframe n;
   starting a transmission of ACK/NACK after $J_0$ NB-IoT UL slots following the end of subframe n+12, wherein the $J_0$ is an offset value and NB-IoT UL slots are determined from a set of UL subframes configured for NB-IoT UL transmission; and
   determining a subcarrier spacing $\Delta f$, wherein the subcarrier spacing $\Delta f$ is used for the transmission of the ACK/NACK;
   in response to determining that the subcarrier spacing $\Delta f$=3.75 kHz,
      setting the $J_0$=0 in response to determining that a value in an ACK/NACK resource field in DCI corresponding to one of {0, 1, 2, 3, 4, 5, 6, 7}; and
      setting the $J_0$=4 in response to determining that a value in an ACK/NACK resource field in DCI corresponding to one of {8, 9, 10, 11, 12, 13, 14, 15};
   in response to determining that the subcarrier spacing $\Delta f$=15 kHz,
      setting the $J_0$=0 in response to determining that a value in an ACK/NACK resource field in DCI corresponding to one of {0, 1, 2, 3};
      setting the $J_0$=4 in response to determining that a value in an ACK/NACK resource field in DCI corresponding to one of {4, 5, 6, 7};
      setting the $J_0$=8 in response to determining that a value in an ACK/NACK resource field in DCI corresponding to one of {8, 9, 10, 11}; and
      setting the $J_0$=10 in response to determining that a value in an ACK/NACK resource field in DCI corresponding to one of {12, 13, 14, 15}.

2. A user equipment, UE, comprising:
   processing circuitry configured to:
      detect, by the UE in a NB-IoT system supporting TDD, a NPDSCH ending in subframe n;
      start a transmission of ACK/NACK after $j_0$ NB-IoT UL slots following the end of subframe n+12, wherein, the $j_0$ is an offset value and NB-IoT UL slots are determined from a set of UL subframes configured for NB-IoT UL transmission; and
      determine a subcarrier spacing $\Delta f$, wherein the subcarrier spacing $\Delta f$ is used for the transmission of the ACK/NACK;
      in responsive to determining that the subcarrier spacing $\Delta f$=3.75 kHz,
         setting the $j_0$=0 in responsive to determining that a value in a ACK/NACK resource field in DCI corresponding to one of {0, 1, 2, 3, 4, 5, 6, 7}; and
         setting the $j_0$=4 in responsive to determining that a value in a ACK/NACK resource field in DCI corresponding to one of {8, 9, 10, 11, 12, 13, 14, 15};
      in responsive to determining that the subcarrier spacing $\Delta f$=15 kHz,
         setting the $j_0$=0 in responsive to determining that a value in a ACK/NACK resource field in DCI corresponding to one of {0, 1, 2, 3};
         setting the $j_0$=4 in responsive to determining that a value in a ACK/NACK resource field in DCI corresponding to one of {4, 5, 6, 7};
         setting the $j_0$=8 in responsive to determining that a value in a ACK/NACK resource field in DCI corresponding to one of {8, 9, 10, 11}; and
         setting the $j_0$=10 in responsive to determining that a value in a ACK/NACK resource field in DCI corresponding to one of {12, 13, 14, 15}.

3. A method performed by a base station, comprising:
   transmitting, by the base station in an NB-IoT system supporting TDD, a NPDSCH ending in subframe n;
   starting a reception of ACK/NACK after $J_0$ NB-IoT UL slots following the end of subframe n+12, wherein the $J_0$ is an offset value and NB-IoT UL slots are determined from a set of UL subframes configured for NB-IoT UL transmission; and determining a subcarrier spacing $\Delta f$, wherein the subcarrier spacing $\Delta f$ is used for the reception of the ACK/NACK;

in response to determining that the subcarrier spacing $\Delta f$=3.75 kHz, setting the $J_0$=0 in response to determining that a value in an ACK/NACK resource field in DCI corresponding to one of {0, 1, 2, 3, 4, 5, 6, 7}; and setting the $J_0$=4 in response to determining that a value in an ACK/NACK resource field in DCI corresponding to one of {8, 9, 10, 11, 12, 13, 14, 15};

in response to determining that the subcarrier spacing $\Delta f$=15 kHz, setting the $J_0$=0 in response to determining that a value in an ACK/NACK resource field in DCI corresponding to one of {0, 1, 2, 3};

setting the $J_0$=4 in response to determining that a value in an ACK/NACK resource field in DCI corresponding to one of {4, 5, 6, 7};

setting the $J_0$=8 in response to determining that a value in an ACK/NACK resource field in DCI corresponding to one of {8, 9, 10, 11}; and setting the $J_0$=10 in response to determining that a value in an ACK/NACK resource field in DCI corresponding to one of {12, 13, 14, 15}.

4. A base station, comprising:

processing circuitry configured to:

transmit, by the base station in a NB-IoT system supporting TDD, a NPDSCH ending in subframe n;

start a reception of ACK/NACK after $j_0$ NB-IoT UL slots following the end of subframe n+12, wherein, the $j_0$ is an offset value and NB-IoT UL slots are determined from a set of UL subframes configured for NB-IoT UL transmission; and determine a subcarrier spacing $\Delta f$, wherein the subcarrier spacing $\Delta f$ is used for the reception of the ACK/NACK;

in responsive to determining that the subcarrier spacing $\Delta f$=3.75 kHz, setting the $j_0$=0 in responsive to determining that a value in a ACK/NACK resource field in DCI corresponding to one of {0, 1, 2, 3, 4, 5, 6, 7}; and setting the $j_0$=4 in responsive to determining that a value in a ACK/NACK resource field in DCI corresponding to one of {8, 9, 10, 11, 12, 13, 14, 15};

in responsive to determining that the subcarrier spacing $\Delta f$=15 kHz, setting the $j_0$=0 in responsive to determining that a value in a ACK/NACK resource field in DCI corresponding to one of {0, 1, 2, 3};

setting the $j_0$=4 in responsive to determining that a value in a ACK/NACK resource field in DCI corresponding to one of {4, 5, 6, 7};

setting the $j_0$=8 in responsive to determining that a value in a ACK/NACK resource field in DCI corresponding to one of {8, 9, 10, 11}; and setting the $j_0$=10 in responsive to determining that a value in a ACK/NACK resource field in DCI corresponding to one of {12, 13, 14, 15}.

* * * * *